(No Model.)
T. A. EDISON.
SYSTEM OF ELECTRICAL DISTRIBUTION.
No. 369,443. Patented Sept. 6, 1887.
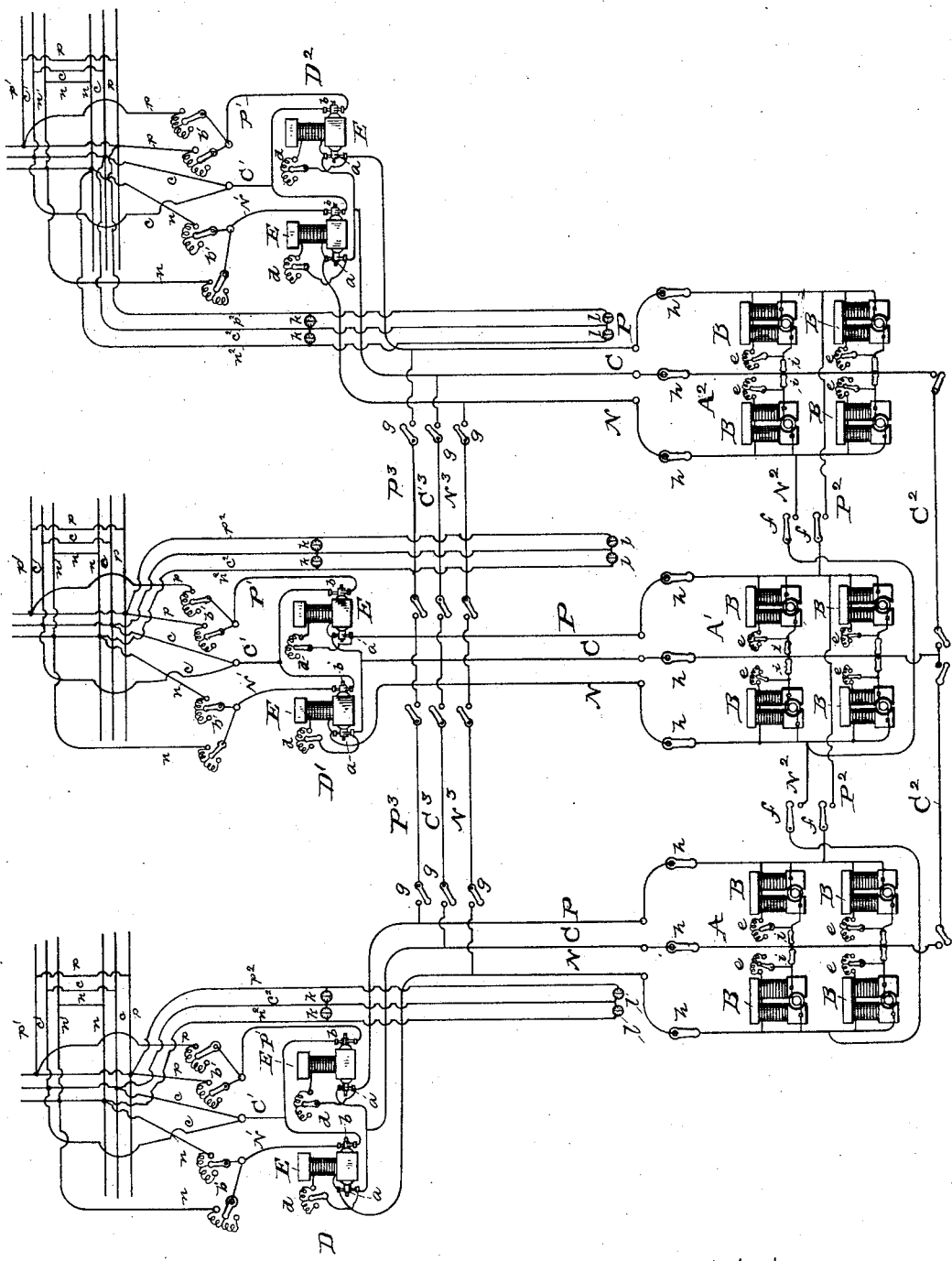

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 369,443, dated September 6, 1887.

Application filed December 27, 1886. Serial No. 222,731. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 710,) of which the following is a specification.

My invention relates to a modification of or improvement upon the system of electrical distribution set forth in my application, No. 703, Serial No. 220,799. In that application is shown and described a source of electricity of high tension, from which a circuit extends to a sub-station, where are placed devices receiving such high-tension current and discharging a current of low tension, which is thence conveyed by feeding-circuits to a connected system of translation-circuits, with which electric lamps or other translating devices are connected.

My present invention consists in providing two or more systems of this general character and conductors, including switches, by means of which such systems may be joined together, so that one source may be made to supply two or more distributing systems, or two or more sources may be thrown onto one distributing system, as such changes are made desirable by reason of variations in the current required by the districts.

My invention is illustrated in the annexed drawing, which is a diagram of a system embodying said invention.

A, A', and $A^2$ represent three groups of generators, B B, which may be all situated at the same place or station, or may be divided between three places or stations. There may be any desired number of such groups of generators, according to the area to be supplied. The generators of each group are shown as arranged to form the divided source in a three-wire or compensating system, although, as will be evident, the invention is as readily applicable to a two-wire system. From each group of generators a three-wire circuit, P C N, extends to a sub-station, D, D', or $D^2$, such sub-stations being each situated within or near the district to be supplied by it.

The generators shown are continuous-current generators, and I therefore provide double-wound rotating tension-reducing converters E E at each sub-station, receiving the high-tension current by connections $a\ a$ in one set of armature-coils and discharging a current of low tension by commutators $b\ b$ from another set of armature-coils. The converters E E at each station are shown as joined in series, and a three-wire circuit, P' C' N', extends from the terminal points or omnibus wires within the station, from which two or more feeding-circuits, $p\ c\ n$, extend to different points of the district supplied, where they are joined to the system of connected mains or lighting-circuits $p'\ c'\ n'$, from which the house-circuits extend, (not shown,) including translating devices, which may be electric lamps, electric motors, or other electrical apparatus adapted to be operated by the current of low tension, such translating devices being connected in multiple series, as is now well understood.

The feeding-circuits are provided with adjustable resistances $b\ b$ for regulating the current conveyed by them, whereby either side of each feeding-circuit may be regulated as the relative number of lamps on the two sides varies, or each feeding-circuit may be regulated relative to the others for unequal distribution or changes in the number of lamps in different parts of the district.

The field-magnets of the converters are shown as energized from the high-tension circuit, (though the field-circuits may extend from the low-tension circuit,) and each is provided with an adjustable resistance, $d$, for regulating the speed of the converter.

The generators B at the main station are provided with regulating resistance $e$ in their field-circuits. The high-tension circuits are preferably provided with line-switches $h$ in each conductor, and each dynamo also may have a switch, $i$, in its armature-circuit.

Between the three main stations or three groups of generators, A A' $A^2$, may extend positive, negative, and compensating conductors $P^2\ N^2\ C^2$, joining the conductors of the high-tension circuits together—positive to positive, negative to negative, and neutral to neutral. Each of these conductors is provided with a circuit making and breaking switch, $f$. Instead of this, there may extend between the sub-stations positive, negative, and compensating conductors $P^3\ N^3\ C^3$, joining like conductors of the high-tension circuits together, and at the sub-stations circuit making and breaking switches $g$ are placed in these joining-conductors, or both these sets of connecting-conductors may be provided, as illustrated.

Normally each of the three systems is run by itself, and is regulated by the adjustment of the field-magnets of generators B for the general regulation of the district and by the feeder-resistances for the changes in distribution and balance; but when so many translating devices are disconnected in the several or in any one or more of the districts that it becomes unnecessary to run so many dynamos to supply those remaining all three of the districts may be thrown upon the generators of one group. In some cases it may be desired to do this at the sub-station. In this case it is done by closing the proper set of switches, $g$, in the conductors $P^3 N^3 C^3$, so that all three of the districts are thrown upon either one of the generator groups or upon any two of them; or two districts may be thrown upon a single group and the third district still run separately from its own group; or such combinations may be made as the exigencies of the case may require. These operations may be performed at the main station, if desired, the circuits $P^2 C^2 N^2$ being provided for this purpose.

Indicating-circuits $p^2 n^2 c^2$, extending from the translation-circuits, preferably from terminals of feeders, are connected to electrical indicators $k\ k$ at the sub-stations, or similar indicators, $l\ l$, at the main station or stations, or, preferably, as shown, to both. In accordance with the showing of these indicators the regulation of the system is accomplished either by the adjustable resistances, which have been described, or by the closing or opening of connecting-circuits.

What I claim is—

1. In a system of electrical distribution, the combination of two or more sub-systems, each composed of a source of supply and a system of translation-circuits supplied therefrom, with circuits provided with switches for connecting said sub-systems together, substantially as set forth.

2. In a system of electrical distribution, the combination of two or more sub-systems, each consisting of a source of supply, a circuit extending therefrom to a sub-station, and feeding-circuits extending from such sub-station to translation-circuits, with conductors provided with switches for connecting said sub-systems together, substantially as set forth.

3. In a system of electrical distribution, the combination of two or more sub-systems, each composed of a source of supply and a system of translation-circuits supplied therefrom, means for regulating the supply of current in each sub-system, and conductors provided with switches for connecting such sub-systems together, substantially as set forth.

4. In a system of electrical distribution, the combination of two or more sub-systems, each composed of a source of electricity of high tension, a circuit extending therefrom to a tension-reducing converter, and translation-circuits supplied from said converter, with conductors provided with switches for connecting said sub-systems together, substantially as set forth.

5. In a system of electrical distribution, the combination of two or more sub-systems, each composed of a source of electricity of high tension, a circuit extending therefrom to a sub-station, a tension-reducing converter at said sub-station, translation-circuits supplied from said converter, and means at the sub-station for regulating the current supplied, with conductors provided with switches for connecting said sub-systems together, substantially as set forth.

6. In a system of electrical distribution, the combination, with two or more sub-systems, each composed of a source of electricity of high tension, a circuit extending therefrom to a tension-reducing converter, and translation-circuits supplied from said converters, of conductors joining like conductors of the high-tension circuits and provided with switches whereby the sub-systems may be joined together, substantially as set forth.

7. In a system of electrical distribution, the combination, with two or more sub-systems, each composed of a source of electricity of high tension, a circuit extending therefrom to a sub-station, a tension-reducing converter at said sub-station, two or more feeding-circuits extending from said converter to a system of translation-circuits, indicating devices connected with said translation-circuits, and means for regulating the current in said feeding-circuits, of conductors connecting like conductors of the high-tension circuit and provided with switches whereby the sub-systems may be joined together, substantially as set forth.

This specification signed and witnessed this 16th day of December, 1886.

THOS. A. EDISON.

Witnesses:
WM. PEZZER,
E. C. ROWLAND.